J. O. REYNOLDS.
WRENCH.
APPLICATION FILED FEB. 24, 1920.
1,373,022.
Patented Mar. 29, 1921.
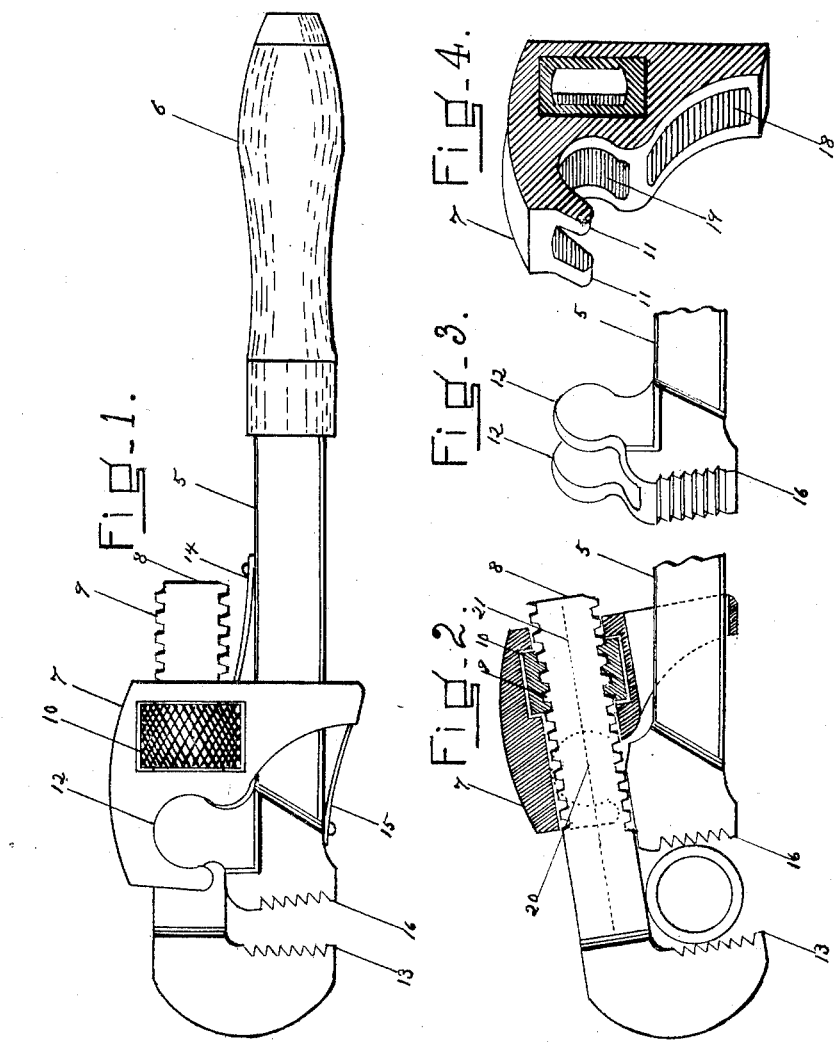
WITNESSES
Thos Griggs
Fred W. Matz
INVENTOR
BY James O. Reynolds

UNITED STATES PATENT OFFICE.

JAMES O. REYNOLDS, OF EVANSVILLE, INDIANA.

WRENCH.

1,373,022.  Specification of Letters Patent.  Patented Mar. 29, 1921.

Application filed February 24, 1920. Serial No. 360,931.

*To all whom it may concern:*

Be it known that I, JAMES O. REYNOLDS, of Evansville, in the county of Vanderburgh and State of Indiana, a citizen of the United States, have invented a new and useful Improvement in Wrenches, of which the following is a specification.

My invention relates especially to a pipe wrench, it is my object to provide such improvement so as to distribute to the best advantage strain put upon the wrench for preventing breakage, twisting or bending of the operating parts and wear thereon.

My invention will be understood by reference to the drawings in which;

Figure 1, is a side view of a wrench having my improvements.

Fig. 2, is a longitudinal section through the working parts thereof, showing the manner in which the wrench is applied to a pipe or similar device.

Fig. 3, is a perspective view of the stationary jaw, with the adjacent arms.

Fig. 4, is a perspective view of the housing, having a semicircle form opening to receive the adjacent arms, and comprising passages separated by a partition.

Referring to the drawings 5 represents the main shank of the wrench provided at one end with a suitable handle 6, at its opposite end with a stationary jaw 16 and a pair of adjacent arms 12 of circular formation having arcs in excess of 180 degrees on their circumference. A housing 7 is pivoted on adjacent arms 12 carrying a movable jaw 13, said movable jaw having a sliding shank 8 threaded in the usual manner to receive an adjusting nut 10.

The housing 7 has a semicircularly formed opening to receive the adjacent arms 12, and comprises passages separated by a partition, and of which passages 18 is that through which the main shank 5 extends, and 19 the one through which the movable shank 8 extends.

The two finger grips, 11, of the housing, 7, are closed around the radius of the circular part of the adjacent arms sufficiently to hold the housing in place, but permitting a rocking movement of the housing on the adjacent arms.

Engaging the movable shank 8 and mounted within the housing 7 is an adjusting nut 10, the housing 7 has the usual side openings to permit of the nut 10 projecting beyond its sides, whereby the nut 10 may be turned upon the threads 9 of the movable shank 8 to adjust its jaw 13 in relation to the jaw 16 of the main shank 5.

In connection with the adjusting nut 10, it will be observed especially by reference to Fig. 2, that the axial line 21 of the movable shank 8, being central with adjacent arms center at 20, are both on the same center, whereas the screw shank 9, having an equal strain on the nut 10, regardless the position of adjustable jaw 13.

For limiting the rocking movement of the housing 7 on its adjacent arms 12, the movable shank 8 will abut the main shank 5 in front of the adjacent arms 12, the housing abutting on the bottom part of the passage, 18, of the housing, through which the main shank, 5, extends, abutting on the main shank also assists in limiting the rocking movement.

The adjacent arms, 12, as shown in Fig. 3 are preferably made quite thick, as the strain and wear of the housing, 7, is the greatest at this place, resulting in very limited strain and wear on the finger grips, 11, which hold the housing on the adjacent arms, 12.

The movable shank, 8, is snugly embraced between the adjacent arms, 12, which assists in the lateral support of the movable shank, 8, and tends to eliminate twisting of the housing.

The wrench is shown in Fig. 1, preferably provided with the usual springs 14 and 15, attached to the opposite sides of the main shank 5, and bearing against the opposite inner walls of the passage, 18, of the housing 7.

The operation is as follows:

The normal position of the parts is substantially as shown in Fig. 1, after the jaws have been brought into engagement with the work the ensuing pressure tends, as the jaws bite into the work, to draw the movable jaw forward over the stationary jaw; at the same time the strain tends to throw the movable jaw outwardly away from the stationary jaw, and to draw the movable shank out of the housing.

The draw upon the movable shank is transmitted to the nut, which draws the housing and the resulting tendency is to turn the housing upwardly on its adjacent arms, which turning is determined or limited by the movable jaw abuting the main shank in front of the adjacent arms.

The adjacent arms act also to take up the side strain and twist of movable jaw shank.

What I claim as my invention is;

In a pipe wrench, the combination with a main shank having a suitable handle on one end, of a stationary jaw, a pair of arms of circular formation having arcs in excess of 180 degrees, a housing pivoted on said arms, a threaded shank provided with a jaw coöperating with the first named jaw, slidable through said housing having its longitudinal axis passing through the center of the arc of said arms and an adjusting nut engaging the threaded shank mounted in the housing.

JAMES O. REYNOLDS.